United States Patent
Guldberg et al.

(10) Patent No.: US 9,479,268 B2
(45) Date of Patent: Oct. 25, 2016

(54) FILTERING INTERFERENCE IN WIRELESS NETWORKS

(71) Applicant: Cellco Partnership, Basking Ridge, NJ (US)

(72) Inventors: Martin G. Guldberg, North Richland Hills, TX (US); Jim Hunter, Burleson, TX (US); Timothy Lee Roco Carter, Fort Worth, TX (US)

(73) Assignee: Cellco Partnership, Basking Ridge, NJ (US)

( * ) Notice: Subject to any disclaimer, the term of this patent is extended or adjusted under 35 U.S.C. 154(b) by 543 days.

(21) Appl. No.: 13/956,083

(22) Filed: Jul. 31, 2013

(65) Prior Publication Data

US 2015/0038098 A1 Feb. 5, 2015

(51) Int. Cl.
*H04B 1/00* (2006.01)
*H04B 15/00* (2006.01)

(52) U.S. Cl.
CPC .................. *H04B 15/00* (2013.01)

(58) Field of Classification Search
CPC ... H04W 24/00; H04W 88/08; H04W 24/10; H04W 56/0035; H04W 92/10; H04B 17/0042; H04B 17/0057; H04L 25/022
USPC .......................... 455/424, 67.11, 63.1, 67.13
See application file for complete search history.

(56) References Cited

U.S. PATENT DOCUMENTS

| | | | | |
|---|---|---|---|---|
| 7,363,008 B2* | 4/2008 | Hassan | ................. | H04W 16/14 370/318 |
| 8,120,469 B2* | 2/2012 | Adamee | ............... | G06K 7/0008 340/10.1 |
| 8,542,638 B2* | 9/2013 | Moelker | ............... | H04W 16/14 370/329 |
| 2002/0142775 A1* | 10/2002 | Dufour | ................. | H04W 24/10 455/447 |
| 2002/0188723 A1* | 12/2002 | Choi | ..................... | H04W 36/06 709/225 |
| 2009/0275337 A1* | 11/2009 | Maeda | ................. | H04W 36/18 455/442 |
| 2011/0124329 A1* | 5/2011 | Lindoff | ................. | H04W 16/14 455/424 |
| 2014/0143322 A1* | 5/2014 | Kotecha | ................. | H04L 51/32 709/204 |
| 2014/0274102 A1* | 9/2014 | Manssour | ............. | H04L 1/0026 455/453 |
| 2015/0017927 A1* | 1/2015 | Kim | ..................... | H04B 17/318 455/67.13 |

FOREIGN PATENT DOCUMENTS

WO        WO 9112675 A1 *   8/1991   ............. H04B 7/005

* cited by examiner

*Primary Examiner* — Ayodeji Ayotunde
*Assistant Examiner* — Max Mathew

(57) ABSTRACT

A first device may receive a parameter to identify interference associated with a frequency; identify the frequency based on the parameter; filter signals associated with the frequency to prevent a second device from receiving the signals associated with the frequency; and provide information identifying the frequency to the second device to cause the second device to prevent a data flow from being assigned to the frequency.

20 Claims, 7 Drawing Sheets

FILTERING INTERFERENCE IN WIRELESS NETWORKS

BACKGROUND

When transmitting data (e.g. data related to voice, video, images, audio, web browsing, application, or the like) flows via a cellular network, a network device, associated with the cellular network, assigns the transmission of the data flows to particular frequencies in a spectrum. The particular frequencies sometimes experience interference as a result of neighboring devices that emit interfering signals (e.g., radio frequency (RF) signals, broadcast signals, or the like). The interference can sometimes cause degradation in the transmission of the data flows (e.g., degradation in voice/video transmission quality, a reduction in transmission speed, an increase in packet-loss rates, an increase in latencies, etc.).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may identify interference, associated with a particular frequency in a spectrum and may block the interference by filtering the particular frequency. In some implementations, the systems and/or methods may prevent the transmission of data flows from being assigned by a network device to the particular frequency associated with the interference (e.g., the filtered frequency), thereby reducing degradation in the transmission of the data flows (e.g., dropped voice calls, degradation in voice/video transmission quality, a reduction in transmission speed, an increase in packet-loss rates, an increase in latencies, etc.).

Figure 1:
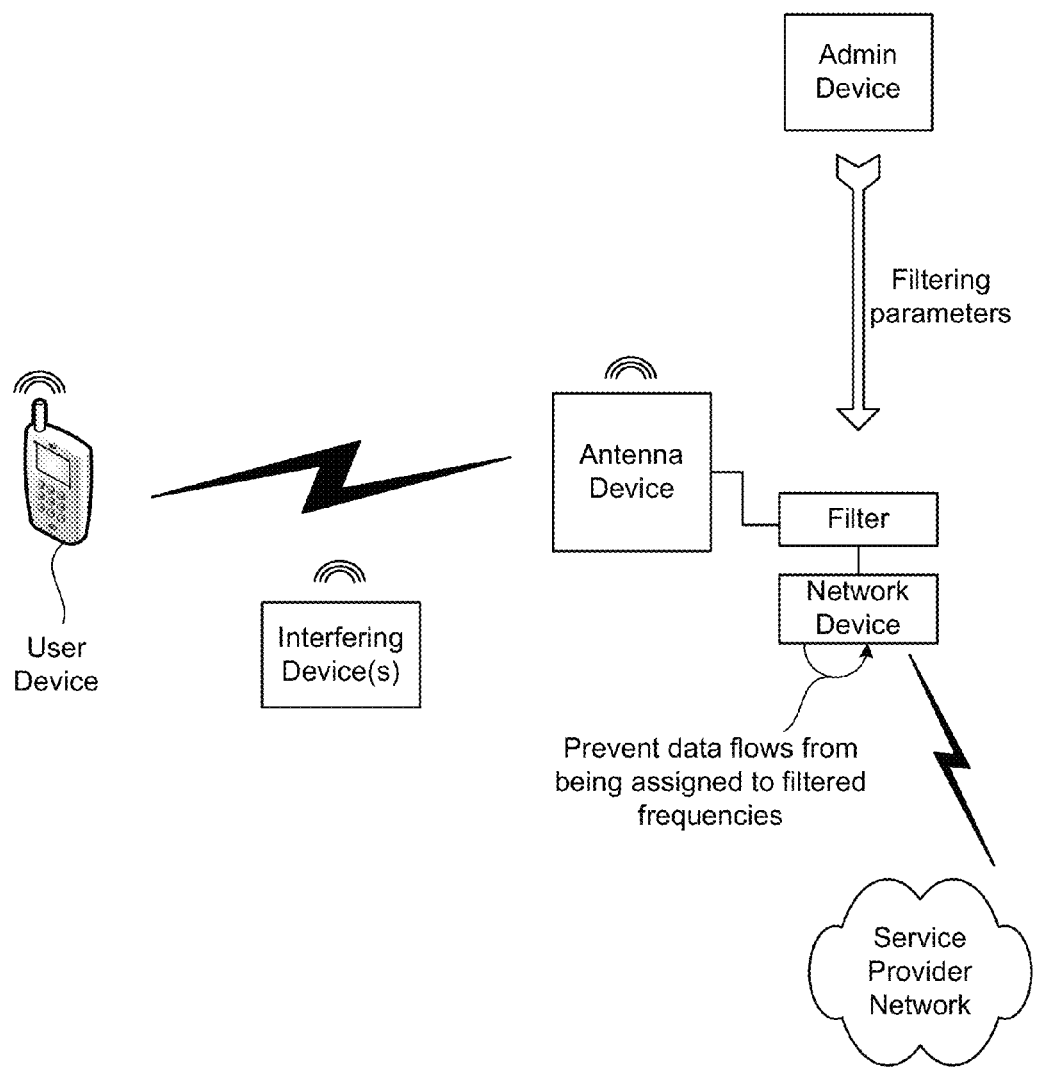
FIG. 1 illustrates an example overview of an implementation described herein.

FIG. 1 illustrates an example overview of an implementation described herein. As shown in FIG. 1, a user device may connect to a network device (e.g., via an antenna device) to access a service provider network (e.g., a cellular network) and to transmit/receive data flows via the service provider network. In some implementations, the network device may assign a particular frequency, located within a spectrum, via which to transmit/receive the data flows. As further shown in FIG. 1, one or more interfering devices may provide interfering signals (i.e., interference) to one or more frequencies in the spectrum. In some implementations, the interference may correspond to radio frequency (RF) signals, broadcast signals, wireless local area network (WLAN) signals, infrared signals, Bluetooth signals, or some other type of signals emitted by the interfering device(s).

In some implementations, a filtering device may identify the interference and may filter the interference to prevent the interference from being received by the network device. For example, the filtering device may identify one or more frequencies, associated with the interference, based on a set of filtering parameters received from an administrator (admin) device. In some implementations, the filtering parameters may identify a particular threshold noise level associated with frequencies in the spectrum (e.g., a noise level corresponding to the presence of interference). In some implementations, the filtering device may identify frequencies that have a noise level exceeding the particular threshold and may filter those frequencies, thereby filtering the interference. As described in greater detail below, the filtering parameters may include some other information that the filter may use to filter frequencies having interference.

In some implementations, the filter may provide information identifying the filtered frequencies to the network device. In some implementations, the network device may prevent the transmission of data flows (e.g., data flows that are to be transmitted/received by the user device) from being assigned to the filtered frequencies. In some implementations, the network device may assign the transmission of the data flows to other frequencies in the spectrum that do not include interference. In some implementations, the filter may identify when interference has been removed from a filtered frequency, and may discontinue filtering the filtered frequency (e.g., to make the previously filtered frequency available). As a result, the filtering device may prevent the network device from receiving the interference, and the network device may prevent the transmission of data flows from being assigned to filtered frequencies, thereby preventing instances of degradation in the transmission of data flows (dropped calls, degradation in voice/video transmission quality, a reduction in transmission speed, an increase in packet-loss rates, an increase in latencies, etc.).

Figure 2A:
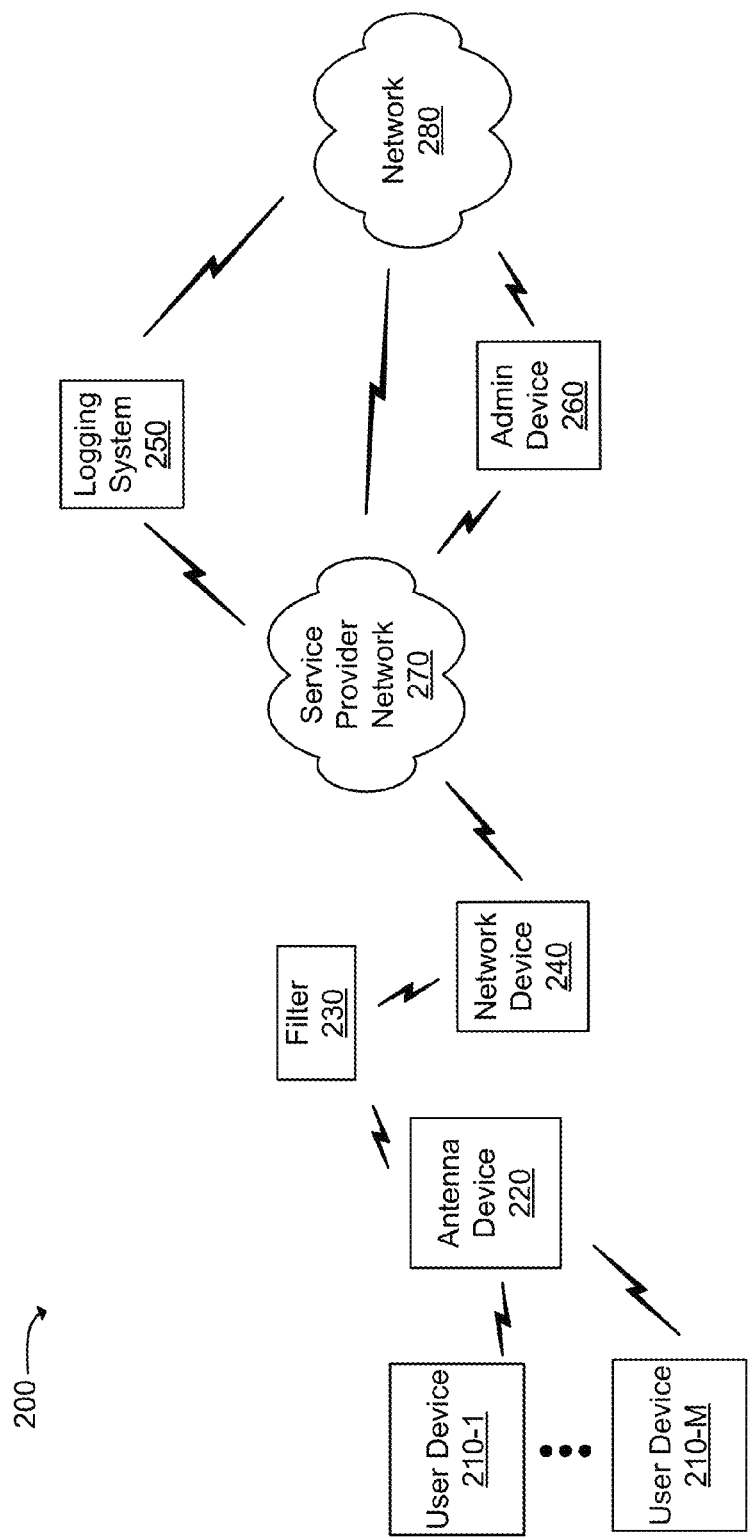
FIG. 2A illustrates an example environment in which systems and/or methods, described herein, may be implemented.

FIG. 2A is a diagram of an example environment 200 in which systems and/or methods described herein may be implemented. As shown in FIG. 2A, environment 200 may include user devices 210, . . . , 210-M (where M≥1), antenna device 220, filter 230, network device 240, logging system 250, admin device 260, service provider network 270, and network 280.

User device 210 may include a computation or communication device, such as a wireless mobile communication device that is capable of communicating with network device 240 and/or a network (e.g., service provider network 270 and/or network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from service provider network 270 and/or network 280.

Antenna device 220 may include a signal receiving device, a signal amplification device, and/or some other type of device. In some implementations, antenna device 220 may correspond to a cellular tower, a directional antenna, an omnidirectional antenna, and/or another type of antenna that might be used in a radio access network (RAN) to receive a connection signal from user device 210 and to connect 210 to network device 240. In some implementations, antenna device 220 may provide signals, corresponding to data flows, to/from user device 210 via network device 240.

Filter 230 may include a frequency filtering device or a collection of frequency filtering devices. In some implementations, filter 230 may include a band-stop filter, a band-rejection filter, a notch filter, and/or some other type of filtering device. In some implementations, filter 230 may include a spectrum analyzer to identify noise levels associated with frequencies in a spectrum. In some implementations, filter 230 may receive filtering parameters (e.g., from admin device 260) and may filter one or more frequencies based on the filtering parameters and/or the noise levels identified via the spectrum analyzer.

Network device 240 may include one or more network devices that receive, process, and/or transmit data flows, such as audio, video, text, and/or other data, destined for and/or received from user device 210. In an example implementation, network device 240 may be an eNodeB (eNB) device and may be part of a cellular network. Additionally, or alternatively, network device 240 may include a base station, a wireless access point, a router, or the like. In some implementations, network device 240 may receive data flows from and/or transmit data flows to network 280 via one or more devices associated with service provider network 270. Network device 240 may transmit data flows to and/or receive data flows from user device 210 via an air interface. In some implementations, network device 240 may assign the transmission of data flows to particular frequencies. One or more of network devices 240 may be associated with a RAN, such as a long-term evolution (LTE) network and/or some other type of network. In some implementations, network device 240 may be part of an evolved packet system (EPS).

In some implementations, network device 240 may receive information identifying filtered frequencies and may prevent the transmission of the data flows from being assigned to the filtered frequencies. Further, network device 240 may reassign data flows from a frequency that is to be filtered (e.g., a frequency where interference is identified) to a frequency that does include interference.

In some implementations, network device 240 may receive the information identifying filtered frequencies from filter 230. Additionally, or alternatively, network device 240 may include a spectrum analyzer and may receive filtering parameters to identify frequencies that are to be filtered. In this case, network device 240 may perform the functions of filter 230 and/or include filter 230.

Logging system 250 may include a server device or a collection of server devices. In some implementations, logging system 250 may receive interference related information, such as information identifying dropped call rates, packet-loss rates, latency values, jitter values, etc., and/or some other information relating to the presence of interference in a spectrum associated with service provider network 270. In some implementations, logging system 250 may receive the interference related information from components of service provider network 270. Additionally, or alternatively, logging system 250 may receive the interference related information from admin device 260 via a web portal and/or some other type of reporting system that receives and/or stores the interference related information.

In some implementations, the interference related information may be used to perform an interference analysis to identify frequencies associated with interference. For example, logging system 250 may identify an indication relating to the presence of interference (e.g., when a packet-loss rate, a latency value, and/or a called drop rate exceeds a particular threshold) and a geographic location of a particular network device 240 associated with the indication. Based on identifying the geographic location, an operator may use a spectrum analyzer (or similar device) at the geographic location to identify particular frequencies that may include the interference. In some implementations, the identified frequencies may be included in filtering parameters provided to filter 230 and/or network device 240.

Admin device 260 may include a computing device, such as a server device, a desktop computing device, and/or some other type of computing device. In some implementations, admin device 260 may provide filtering parameters to filter 230 and/or network device 240. In some implementations, admin device 260 may provide filtering related information to logging system 250 (e.g., based on analysis that identifies the frequencies associated with the interference).

Service provider network 270 may include one or more wired and/or wireless networks. For example, service provider network 270 may include a public land mobile network (PLMN), and/or a cellular network (e.g., a second generation (2G) network, a third generation (3G) network, a fourth generation (4G) network, a fifth generation (5G) network, a long term evolution (LTE) network, etc.). Additionally, or alternatively, service provider network 270 may include a local area network (LAN), a wireless LAN (WLAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, or a combination of these or other types of networks.

In some implementations, service provider network 270 may include an evolved packet core (EPC) having a serving gateway (SGW), a packet data network (PDN) gateway (PGW), a mobile management entity (MME) device, and/or some other device to transmit data flows to/from user device 210 via network device 240 and via a frequency assigned by network device 240. That is, data flows may be transmitted via components of the EPC, network device 240, and the frequency assigned by network device 240.

In some implementations, service provider network 270 may provide interference related information to logging system 250 (e.g., packet-loss rates, dropped call rates, latency values, jitter values, etc.). Additional details regarding service provider network 270 are described below with respect to FIG. 2B.

Network 280 may include one or more wired and/or wireless networks. For example, network 280 may include a cellular network and/or a PLMN. Additionally, or alternatively, network 280 may include a LAN, a WLAN, a WAN, a MAN, a telephone network (e.g., the PSTN), an ad hoc network, a managed IP network, a virtual private network (VPN), an intranet, the Internet, a fiber optic-based network, or a combination of these or other types of networks.

The quantity of devices and/or networks, illustrated in FIG. 2A, is not limited to what is shown. In practice, there may be additional devices and/or networks; fewer devices and/or networks; different devices and/or networks; or differently arranged devices and/or networks than illustrated in FIG. 2A. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 2B:
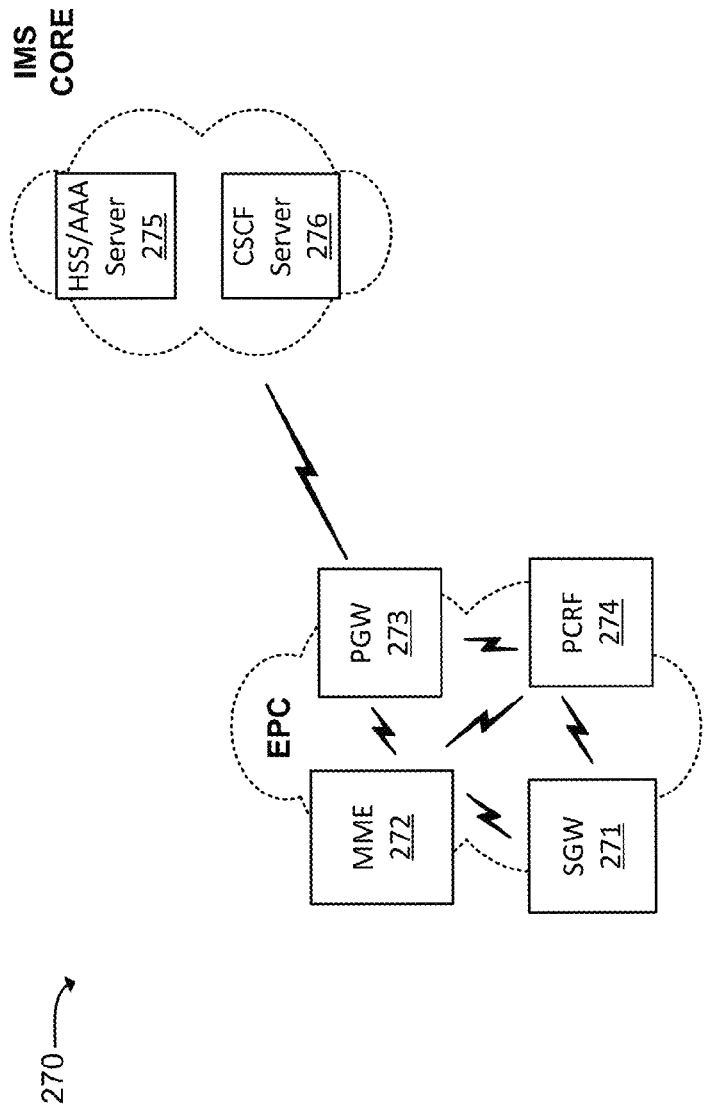
FIG. 2B illustrates example components of a service provider network that may be used within the environment of FIG. 2.

FIG. 2B illustrates example components of service provider network 270. As shown in FIG. 2B, service provider network 270 may include a serving gateway (SGW) device 271 (referred to as "SGW 271"), a mobility management entity (MME) device 272 (referred to as "MME 272"), a packet data network (PDN) gateway (PGW) 273 (referred to as "PGW 273"), a policy charging rules function (PCRF) device 274 (referred to as "PCRF 274"), a home subscriber server (HSS)/authentication, authorization, accounting (AAA) server 275 (referred to as an "HSS/AAA server 275"), and a call service control function (CSCF) server 276 (referred to as "CSCF server 276").

In some implementations, service provider network 270 may include an evolved packet core (EPC) that operates based on a third generation partnership project (3GPP) wireless communication standard. The EPC may include SGW 271, MME 272, PGW 273, and/or PCRF 274 and may enable user device 210 to communicate with network 280 and/or an Internet protocol (IP) multimedia subsystem (IMS) core. The IMS core may include HSS/AAA server 275 and/or CSCF server 276, and may manage authentication, connection initiation, account information, a user profile, etc. associated with user device 210. In some implementations, an evolved packet system (EPS) may include network device 240 and the EPC.

SGW 271 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 271 may, for example, aggregate traffic received from one or more network devices 240 (e.g., antenna devices) and may send the aggregated traffic to network 280 via PGW 273. In one example implementation, SGW 271 may route and forward user data packets, may act as a mobility anchor for a user plane during inter-base station handovers, and may act as an anchor for mobility between LTE and other 3GPP technologies.

MME 272 may include one or more network devices that perform operations associated with a handoff to and/or from the EPS. MME 272 may perform operations to register user device 210 with the EPS, to handoff user device 210 from the EPS to another network, to handoff a user device 210 from the other network to the EPS, and/or to perform other operations. MME 272 may perform policing operations for traffic destined for and/or received from user device 210. MME 272 may authenticate user device 210 (e.g., via interaction with HSS/AAA server 275).

PGW 273 may include one or more network devices, such as a gateway, a router, a modem, a switch, a firewall, a NIC, a hub, a bridge, a proxy server, an OADM, or some other type of device that processes and/or transfers traffic. PGW 273 may, for example, provide connectivity of user device 210 to external packet data networks by being a traffic exit/entry point for user device 210. PGW 273 may perform policy enforcement, packet filtering, charging support, lawful intercept, and/or packet screening. PGW 273 may also act as an anchor for mobility between 3GPP and non-3GPP technologies.

PCRF 274 may include one or more network devices, that may store subscriber information, such as voice call and data rate plans or quotas for subscribers. PCRF 274 may provide network control regarding service data flow detection, gating, (Quality of Service) QoS, and/or flow based charging. Policies and rules regarding QoS may include policies and rules instructing user device 210 and/or network devices (e.g., network device 240, SGW 271, MME 272, PGW 273, etc.) to minimize packet loss, to implement a packet delay budget, to provide a guaranteed bit rate (GBR), to provide a particular latency, and/or to perform other activities associated with QoS. PCRF 274 may provide policies and rules to other network devices, such as HSS/AAA server 275, and/or PGW 273, to implement network control. PCRF 274 may determine how a certain service data flow shall be treated, and may ensure that user plane traffic mapping and QoS is in accordance with a user's profile and/or network policies.

HSS/AAA server 275 may include one or more computing devices, such as a server device or a collection of server devices. In some implementations, HSS/AAA server 275 may include a device that gathers, processes, searches, stores, and/or provides information in a manner described herein. For example, HSS/AAA server 275 may manage, update, and/or store, in a memory associated with HSS/AAA server 275, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 275 may include a device that performs authentication, authorization, and/or accounting (AAA) operations associated with a communication connection with user device 210.

CSCF server 276 may include one or more computing devices, such as a server device or a collection of server devices. In some implementations, CSCF server 276 may include a device that gathers, processes, searches, stores, and/or provides information in a manner described herein. CSCF server 276 may process and/or route calls to and from user device 210 via the EPC. For example, CSCF server 276 may process calls, received from network 280, that are destined for user device 210. In another example, CSCF server 260 may process calls, received from user device 210, that are destined for network 280.

The quantity of devices and/or networks, illustrated in FIG. 2B, is not limited to what is shown. In practice, there may be additional devices and/or networks; fewer devices and/or networks; different devices and/or networks; or differently arranged devices and/or networks than illustrated in FIG. 2B. Also, in some implementations, one or more of the devices of service provider network 270 may perform one or more functions described as being performed by another one or more of the devices of service provider network 270. Devices of service provider network 270 may interconnect via wired connections, wireless connections, or a combination of wired and wireless connections.

Figure 3:
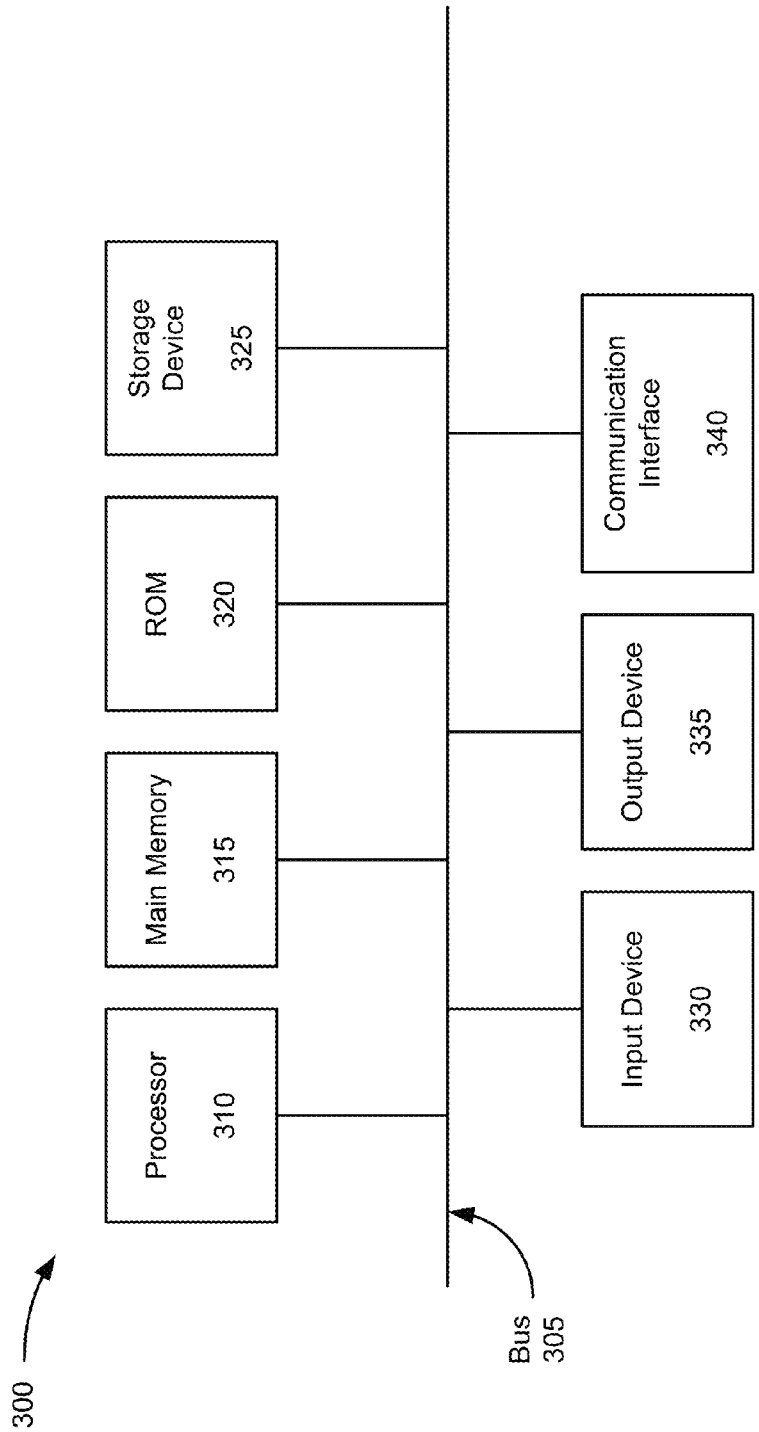
FIG. 3 illustrates example components of a device that may be used within the environment of FIG. 2.

FIG. 3 illustrates example components of a device 300 that may be used within environment 200 of FIG. 2. Device 300 may correspond to user device 210, antenna device 220, filter 230, network device 240, logging system 250, and/or admin device 260. Each of user device 210, antenna device 220, filter 230, network device 240, logging system 250, and/or admin device 260 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
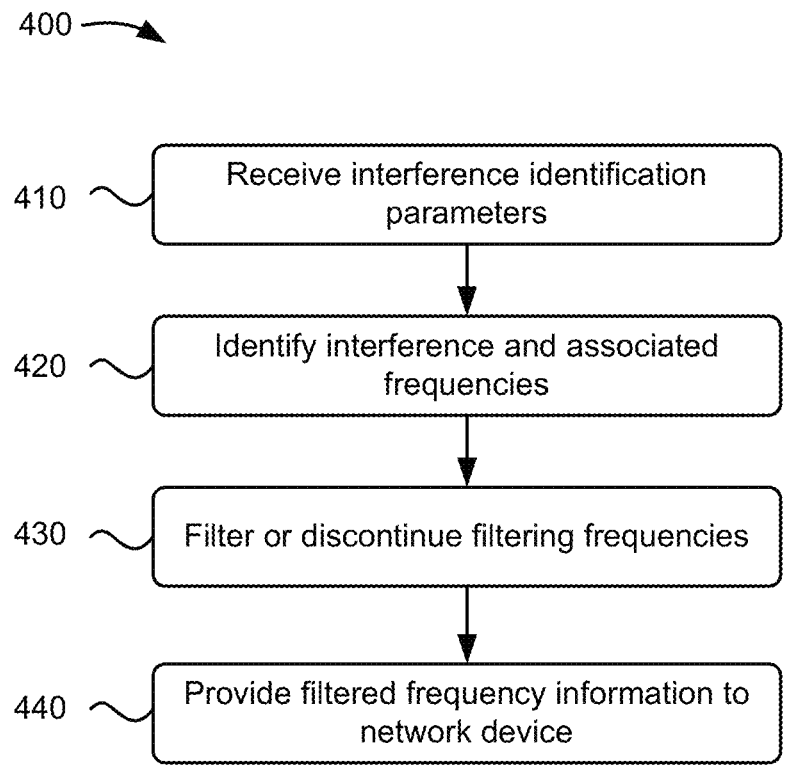
FIG. 4 illustrates a flowchart of an example process for providing filtered frequency information.

FIG. 4 illustrates a flowchart of an example process 400 for providing filtered frequency information. In some implementations, process 400 may be performed by one or more components of filter 230. In some implementations, some or all of blocks of process 400 may be performed by one or more components of another device in environment 200 (e.g., user device 210, antenna device 220, network device 240, logging system 250, and/or admin device 260), or a group of devices including or excluding filter 230.

As shown in FIG. 4, process 400 may include receiving interference identification parameters (block 410). For example, filter 230 may receive the interference identification parameters from an operator via admin device 260. In some implementations, the interference identification parameters may include a threshold noise level that may indicate the presence of interference when the threshold noise level is exceeded for a particular frequency. In some implementations, the interference identification parameters may include some other information that can be used to determine interference, such as a threshold number of standard deviations above a mean or median noise level over a particular amount of time across frequencies in a spectrum. In some implementations, the measurement of noise level exceeding the threshold number of standard deviations above the mean or median noise level may indicate the presence of interfering signals for a particular frequency.

In some implementations, the interference identification parameters may include a particular frequency that is to be filtered based on an analysis that identifies that the frequency includes interference. For example, as described above, logging system 250 may identify geographic locations of particular network devices 240 that may be associated with interference (e.g., based on interference related information, such as dropped call rates, latency values, jitter values, packet-loss rates, or the like). In some implementations, an operator may use a spectrum analyzer, when located in the identified geographic location, to identify noise levels at particular frequencies, and may identify noise levels that exceed a particular threshold based on information gathered by the spectrum analyzer.

Process 400 may also include identifying interference and associated frequencies (block 420). For example, filter 230 may identify the interference based on information gathered by a spectrum analyzer of filter 230 and based on the interference identification parameters. For example, assume that the interference identification parameters identify a threshold number of standard deviations above a mean noise level over a particular amount of time. Given this assumption, filter 230 may identify the mean noise level over the particular amount of time and the standard deviation of the mean noise level based on information gathered by the spectrum analyzer. Further, filter 230 may identify when a noise level exceeds the threshold number of standard deviations and may identify the frequency associated with the noise level.

As an example, assume that filter 230 identifies that the mean noise level is −115 decibels (dB) over particular frequencies in a spectrum associated with network device 240 (e.g., the frequencies 200 megahertz (MHz) to 300,000 MHz)). Further, assume that filter 230 identifies a standard deviation of five dB and that the interference identification parameters identify a threshold number of four standard deviations. Given these assumptions, filter 230 may identify when the noise level exceeds −95 dB and may identify one or more frequencies in which the noise level exceeds −95 dB (e.g., frequencies associated with interference).

As another example, assume that the interference identification parameters identify a threshold noise level of −95 dB. Given this assumption, filter 230 may identify when the noise level exceeds −95 dB and may identify one or more frequencies in which the noise level exceeds −95 dB (e.g., without determining the mean or median and/or standard deviation noise levels associated with the frequencies in the spectrum).

In some implementations, filter 230 may identify frequencies associated with interference without determining that the noise level has exceeded a particular threshold or determining that the noise level has exceeded a particular number of thresholds above a mean or median noise level. For example, filter 230 may identify the frequencies associated with the interference when the interference identification parameters include the identified frequencies (e.g., when the frequencies are identified via an interference analysis as described above).

In some implementations, filter 230 may identify when interference has been removed from particular frequencies when the noise level drops below the particular threshold, when the noise level has dropped below the threshold number of standard deviations, and/or when the interference identification parameters indicate that the interference has been removed from the frequencies (e.g., based on an interference analysis).

Process 400 may further include filtering or discontinuing filtering of the frequencies (block 430). For example, filter 230 may filter the frequencies based on identifying the frequencies having interference as described above. In some implementations, filter 230 may filter the identified frequencies via a band-stop filter, a notch filter, or the like. For example, filter 230 may attenuate the identified frequencies to a level below a particular threshold such that the identified frequencies and the interference in the identified frequencies may not be received by network device 240. Further, filter 230 may pass unfiltered frequencies unaltered such that transmission of data flows may be assigned to the unfiltered frequencies.

In some implementations, filter 230 may discontinue filtering the identified frequencies when interference has been removed from the identified frequencies (e.g., when the noise level drops below a particular threshold, when the noise level has dropped below a threshold number of standard deviations, and/or when the interference identification parameters indicate that the interference has been removed from the frequencies). As a result, the frequencies may be made available for data flow transmission.

Process 400 may also include providing filtered frequency information to the network device (block 440). For example, filter 230 may provide the filtered frequency information to network device 240 based on identifying the presence of interference and/or identifying that interference has been removed (e.g., in accordance with block 420). In some implementations, the filtered frequency information may identify frequencies that are to be filtered or have been filtered by filter 230. Additionally, or alternatively, the filtered frequency information may identify frequencies that had been filtered, but are no longer being filtered (e.g., when filter 230 identifies that the interference has been removed).

In some implementations, network device 240 may prevent data flows from being assigned to the filtered frequencies by updating a scheduler and/or a control component, associated with network device 240, that assigns the transmission of data flows to particular frequencies. For example, assume that the filtered frequency information identifies that frequencies 750 MHz-760 MHz are to be filtered. Given this assumption, network device 240 may update the scheduler and/or the control component to remove frequencies 750 MHz-760 MHz from a schedule that is used to assign the transmission of data flows to particular frequencies. Additionally, or alternatively, network device 240 may prevent the transmission of data flows from being assigned to filtered frequencies using some other technique.

In some implementations, network device 240 may update the scheduler and/or the control component of network device 240 to allow previously filtered frequencies to be made available for transmitting data flows. For example, assume that network device 240 prevents assigning the transmission of data flows to frequencies 750 MHz-760 MHz (e.g., based on filtered frequency information received from filter 230 that identifies that frequencies 750 MHz-760 MHz are to be filtered due to interference). Further, assume that at a later point in time, filter 230 identifies that the interference has been removed from frequencies 750 MHz-760 MHz. Given these assumptions, filter 230 may provide filtered frequency information that identifies that the transmission of the data flows may be assigned to frequencies 750 MHz-760 MHz. Further, network device 240 may update the scheduler and/or the control component to add frequencies 750 MHz-760 MHz to the schedule used to assign data flows.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

In some implementations, network device 240 may perform some blocks of process 400. For example, network device 240 may receive interference identification parameters from admin device 260 (block 410). Further, network device 240 may include a spectrum analyzer to identify interference and associated frequencies, for example, to identify frequencies that include interference and/or to identify frequencies where interference has been removed (block 420). Based on identifying the frequencies, network device 240 may update a scheduler and/or a control component of network device 240 to prevent the assignment of data flows to frequencies having interference, to allow data flows to be assigned to previously filtered frequencies.

Figure 5:
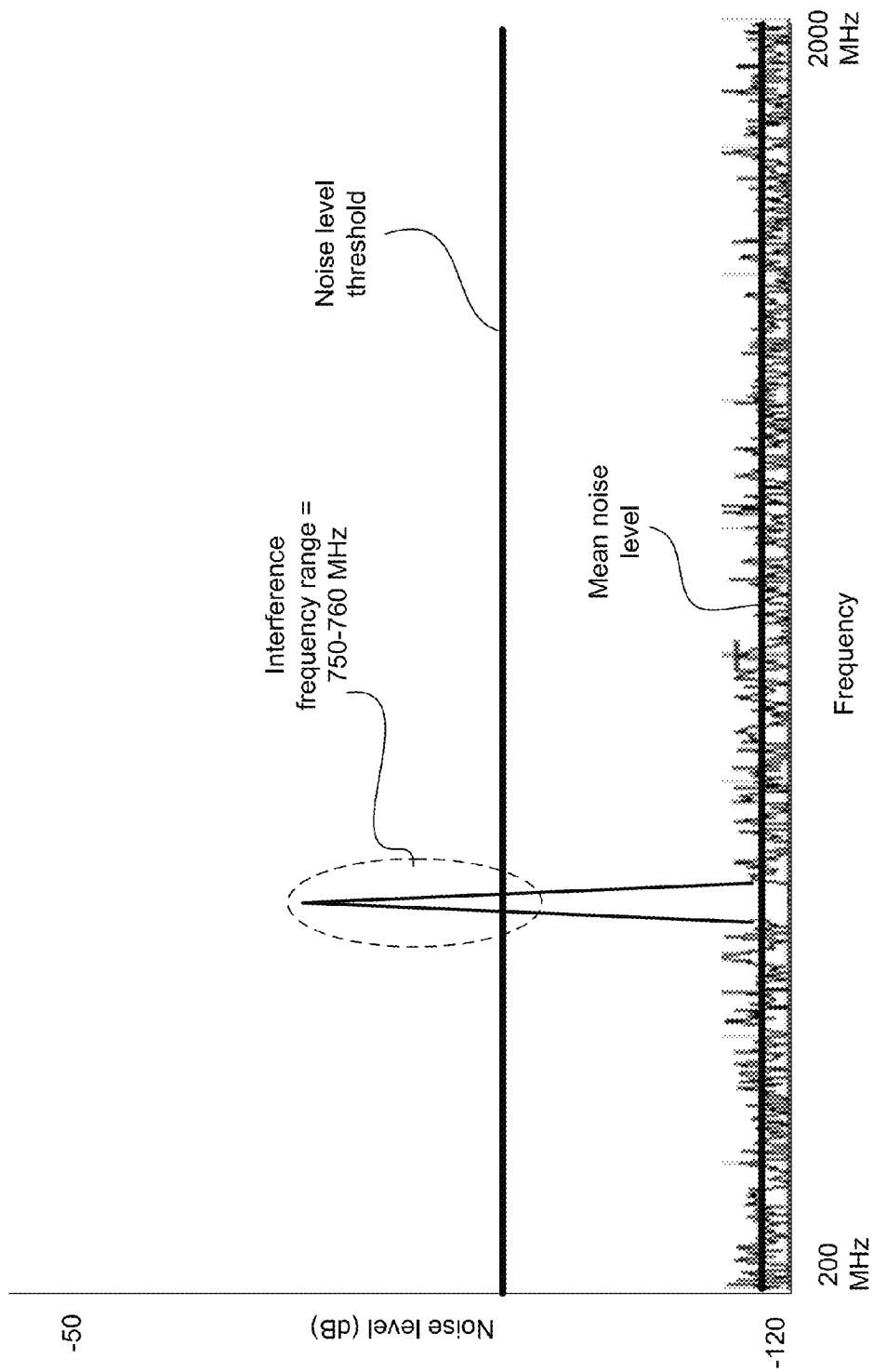
FIG. 5 illustrates an example implementation as described herein.

FIG. 5 illustrates an example implementation as described herein. In some implementations, FIG. 5 may illustrate a graph of noise level measurements gathered by a spectrum analyzer associated with filter 230 and/or network device 240. As shown in FIG. 5, a mean noise level over particular frequencies in a spectrum (e.g., frequencies ranging from approximately 200 MHz to 2000 MHz) may be determined by the spectrum analyzer based on the noise level measurements. In some implementations, filter 230 and/or network device 240 may identify frequencies associated with a noise level above a noise level threshold (e.g., a predetermined threshold and/or a threshold relating to a number of standard deviations above the mean noise level). In the example shown in FIG. 5, an interference frequency range (e.g., frequencies that may have noise levels indicative of the presences of interference) of 750 MHz-760 MHz may be determined based on the noise level measurements gathered by the spectrum analyzer and based on the interference filtering parameters. As described above, filter 230 may filter identified frequencies (e.g., frequencies corresponding to the interference frequency range) and network device 240 may prevent assignment of data flows to the filtered frequencies.

While a particular example is shown in FIG. 5, it will be apparent that the above description is merely an example implementation. Other examples are possible and may differ from what was described with regard to FIG. 5. In some implementations, a spectrum may include additional, fewer, or different frequencies than shown in FIG. 5. For example, the spectrum may include frequencies ranging from approximately 200 MHz to 300,000 MHz.

Figure 6:
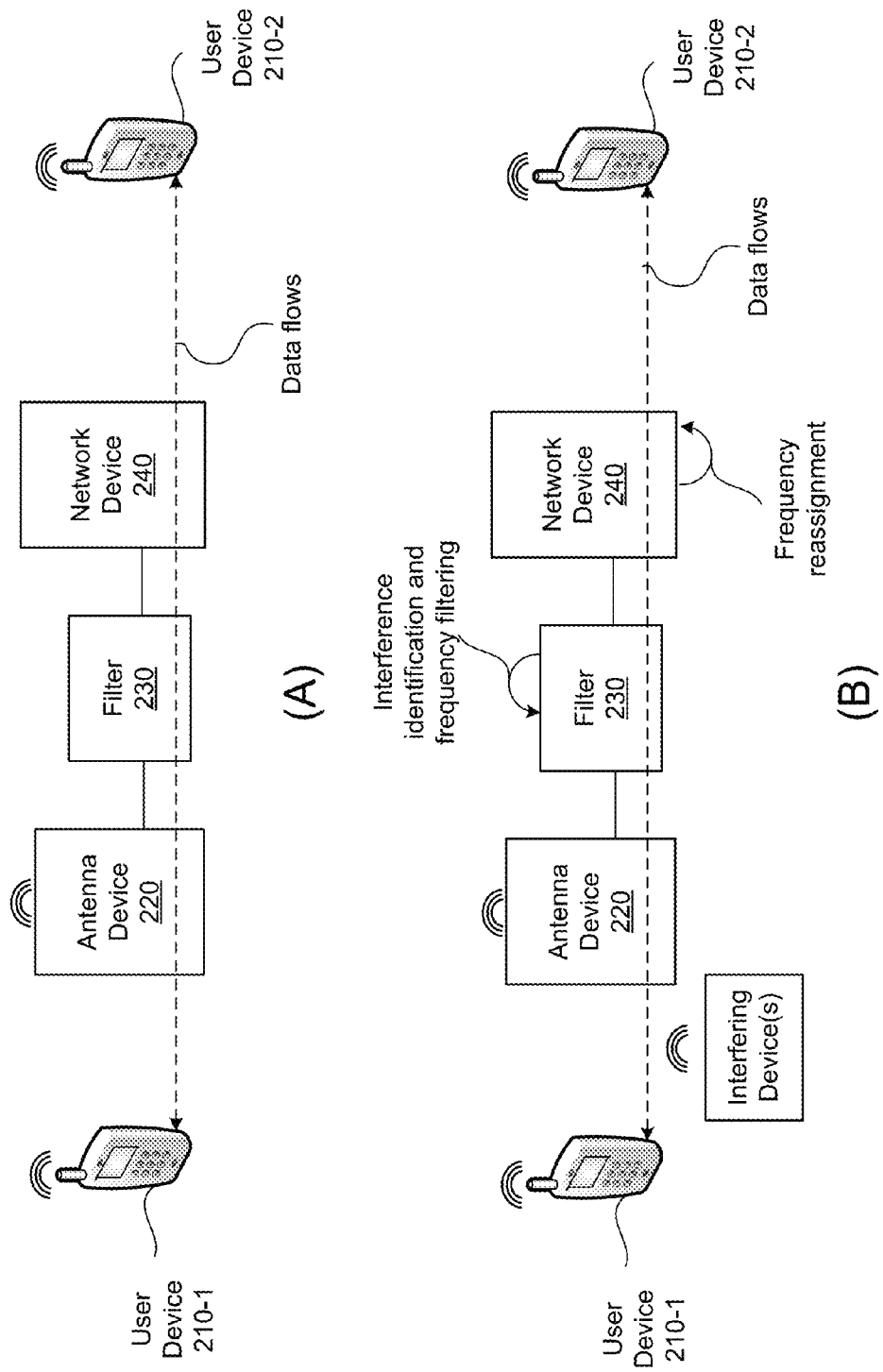
FIG. 6 illustrates an example implementation as described herein.

FIG. 6 illustrates an example implementation as described herein. As shown in (A), network device 240 may facilitate the transmission of data flows between user device 210-1 and user device 210-2. In (A), assume that filter 230 allows frequencies, received by antenna device 220 and corresponding to the data flows, to pass through to network device 240 (e.g., when filter 230 does not identify interfering signals).

Referring to (B), assume that at a later time, one or more interfering devices emit interfering signals via frequencies assigned to the transmission of the data flows between user device 210-1 and user device 210-2. Given this assumption, filter 230 may identify the frequencies having the interference (e.g., based on noise level measurements gathered by a spectrum analyzer and based on noise level thresholds associated with filtering parameters), filter the identified frequencies, and provide information identifying the filtered frequencies to network device 240. In some implementations, network device 240 may reassign the transmission of the data flows to unfiltered frequencies such that the data flows may be transmitted without degradation associated with the interference.

As an example, assume that user device 210-1 and user device 210-2 transmit data flows relating to a call session (e.g., a voice or video call session). Given this assumption, network device 240 may reassign the transmission of the data flows when filter 230 identifies and filters the frequencies having the interference such that the transmission of the data flows may be reassigned to unfiltered frequencies that do not have interference. As a result, the call session may continue without degradation associated with the interference. Further, the call session may be less likely to be dropped as a result of the frequency reassignment than if network device 240 did not reassign the transmission of the data flows.

While a particular example is shown in FIG. 6, it will be apparent that the above description is merely an example implementation. Other examples are possible and may differ from what was described with regard to FIG. 6.

As described above, filtering device 230 may prevent network device 240 from receiving frequencies that interference. Further, network device 240 may prevent the transmission of data flows from being assigned to filtered frequencies, thereby preventing instances of degradation of the transmission of data flows (dropped calls, degradation in voice/video transmission quality, a reduction in transmission speed, an increase in packet-loss rates, an increase in latencies, etc.).

While systems and/or methods, described herein, relate to filtering interference in cellular networks, the systems and/or methods are not so limited. For example, the systems and/or methods may be used to filter interference and prevent the transmission of data flows from being assigned to filtered frequencies in another type of network, such as a WLAN network, a Bluetooth network, an RF network, or the like.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" for similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a device, a parameter to identify interference;
   identifying, by the device and based on the parameter, the interference and a frequency associated with the interference;
   filtering, by the device and based on identifying the interference and the frequency, signals associated with the frequency to prevent a network device from receiving the signals associated with the frequency; and
   providing, by the device, information identifying the frequency to the network device to cause the network device to prevent a data flow from being assigned to the frequency,
      the network device using the information to update schedule information associated with another data flow.

2. The method of claim 1, where the parameter identifies a threshold, and the method further comprises:
   identifying that a noise level, associated with the frequency, exceeds the threshold, where identifying the frequency includes:
      identifying that the noise level exceeds the threshold.

3. The method of claim 1, where the parameter identifies a threshold quantity of standard deviations over a mean or median noise level associated with frequencies in a spectrum associated with the network device, and the method further comprises:
   determining the mean noise level;
   determining the standard deviation associated with the mean noise level; and
   determining that a noise level, associated with the frequency, exceeds the threshold quantity of standard deviations over the mean noise level,
   where identifying the frequency includes:
      identifying that the noise level exceeds the threshold quantity of standard deviations over the mean noise level.

4. The method of claim 1, where the parameter identifies the frequency based on an analysis that identifies the interference and the frequency.

5. The method of claim 1, further comprising:
identifying that the interference has been removed;
discontinuing filtering the signals associated with the frequency to allow the frequency to be available for transmission of the data flow; and
providing information, identifying that the interference has been removed, to the network device to cause the network device to permit a data flow to be assigned to the frequency.

6. The method of claim 1, where the frequency is a first frequency, and
where the network device reassigns a transmission of the data flow from the first frequency to a second frequency,
signals, associated with the second frequency, being provided by the device to the network device to permit the data flow to be assigned to the second frequency.

7. The method of claim 1, where providing the information identifying the frequency to the network device further causes the network device to modify a scheduler or control component of the network device to prevent an assignment of the data flow to the frequency.

8. The method of claim 1, where identifying the frequency is further based on information gathered by a spectrum analyzer that identifies a noise level associated with the frequency.

9. A system comprising:
a device to:
receive a parameter to identify interference;
identify, based on the parameter and a noise level indicative of a presence of the interference, the interference and a frequency associated with the interference;
filter, based on identifying the interference and the frequency, signals associated with the frequency to prevent a network device from receiving the signals associated with the frequency; and
provide information identifying the frequency to the network device to cause the network device to prevent a data flow from being assigned to the frequency,
the network device using the information to update schedule information associated with another data flow.

10. The system of claim 9, where the parameter identifies a threshold, and the device is further to:
identify that the noise level exceeds the threshold, where, when identifying the frequency, the device is to:
identify the frequency based on identifying that the noise level exceeds the threshold.

11. The system of claim 9, where the parameter identifies a threshold quantity of standard deviations over a mean noise level associated with frequencies in a spectrum associated with the network device, and the device is further to:
determine the mean noise level;
determine the standard deviation associated with the mean noise level; and
determine that the noise level exceeds the threshold quantity of standard deviations over the mean noise level,
where, when identifying the frequency, the device is to:
identify the frequency based on determining that the noise level exceeds the threshold quantity of standard deviations over the mean noise level.

12. The system of claim 9, where the first device is further to:
identify that the interference has been removed;
discontinue filtering the signals associated with the frequency to allow the frequency to be available to the network device; and
provide information identifying that the interference has been removed to the network device to cause the network device to permit a data flow to be assigned to the frequency.

13. The system of claim 9, where the frequency is a first frequency,
where, when providing the information identifying the frequency to the network device, the device is to:
provide information identifying the first frequency to cause the network device to reassign a transmission of the data flow from the first frequency to a second frequency, and
where the device is further to:
provide signals, associated with the second frequency, to the network device to permit the transmission of the data flow to be assigned to the second frequency.

14. The system of claim 9, where, when providing the information identifying the frequency to the network device, the device is to:
provide the information identifying the frequency to cause the network device to modify a scheduler or control component of the network device to prevent an assignment of the data flow to the frequency.

15. A non-transitory computer-readable medium for storing instructions, the instructions comprising:
one or more instructions which, when executed by one or more processors, cause the one or more processors to:
receive a parameter to identify interference;
identify, based on the parameter and a noise level indicative of a presence of the interference, the interference and a frequency associated with the interference;
filter, based on identifying the interference and the frequency, signals associated with the frequency to prevent a network device from receiving the signals associated with the frequency; and
provide information identifying the frequency to the network device to cause the network device to a data flow from being assigned to the frequency,
the network device using the information to update schedule information associated with another data flow.

16. The non-transitory computer-readable medium of claim 15, where the parameter identifies a threshold,
where the instructions further include:
one or more instructions to identify that a noise level, associated with the frequency, exceeds the threshold, and
where one or more instructions to identify the frequency include:
one or more instructions to identify the frequency based on identifying that the noise level exceeds the threshold.

17. The non-transitory computer-readable medium of claim 15, where the parameter identifies a threshold quantity of standard deviations over a mean noise level associated with frequencies in a spectrum associated with the network device,
where the instructions further include:
one or more instructions to determine the mean noise level;

one or more instructions to determine the standard deviation associated with the mean noise level; and one or more instructions to determine that the noise level exceeds the threshold quantity of standard deviations over the mean noise level, and where one or more instructions to identify the frequency include:

one or more instructions to identify the frequency based on determining that the noise level exceeds the threshold quantity of standard deviations over the mean noise level.

18. The non-transitory computer-readable medium of claim 15, where the frequency is a first frequency, where one or more instructions to provide the information identifying the frequency to the network device include:

one or more instructions to provide information identifying the first frequency to cause the network device to reassign the data flow from the first frequency to a second frequency, and where the instructions further include:

one or more instructions to provide signals, associated with the second frequency, to the network device to permit the data flow to be assigned to the second frequency.

19. The non-transitory computer-readable medium of claim 15, where the instructions further include:

one or more instructions to identify that the interference has been removed;

one or more instructions to discontinue filtering the signals associated with the frequency to allow the frequency to be available for transmission of the data flow; and one or more instructions to provide information identifying that the interference has been removed to the network device to cause the network device to a data flow to be assigned to the frequency.

20. The non-transitory computer-readable medium of claim 15, where the one or more instructions to provide the information identifying the frequency to the network device include:

one or more instructions to provide the information identifying the frequency to cause the network device to modify a scheduler or control component of the network device to prevent an assignment of the data flow to the frequency.

\* \* \* \* \*